United States Patent [19]

Takayanagi et al.

[11] 3,892,914

[45] July 1, 1975

[54] SYSTEM FOR RECORDING AND REPRODUCING PICTURE SIGNALS WITH AMPLITUDE REFERENCE SIGNALS

[75] Inventors: Shinji Takayanagi; Hitoshi Sato; Koichi Koshikawa, all of Tokyo, Japan

[73] Assignee: Nihon Denshi Kabushiki Kaisha, Tokyo, Japan

[22] Filed: Mar. 15, 1973

[21] Appl. No.: 341,528

[30] Foreign Application Priority Data

Mar. 18, 1972 Japan .............................. 47-27576
Mar. 18, 1972 Japan .............................. 47-27577

[52] U.S. Cl. .................................. 178/6.7 A; 358/7
[51] Int. Cl.[2] .......................................... H04N 5/84
[58] Field of Search ........ 178/5.4 CD, 5.2 D, 6.7 A; 358/6, 7

[56] References Cited

UNITED STATES PATENTS

| | | | |
|---|---|---|---|
| 3,459,885 | 8/1969 | Goldmark et al. | 178/5.4 CD |
| 3,506,778 | 4/1970 | Gold et al. | 178/5.4 CD |
| 3,535,992 | 10/1970 | Goldmark et al. | 178/5.2 D |
| 3,591,268 | 7/1971 | Neale | 178/5.2 D |
| 3,644,677 | 2/1972 | Cecchin et al. | 178/6.7 A |
| 3,721,754 | 3/1973 | Miyauchi | 178/5.4 CD |
| 3,728,477 | 4/1973 | Kubota | 178/5.4 CD |
| 3,730,976 | 5/1973 | Parker | 178/5.4 CD |
| 3,749,821 | 7/1973 | Miyauchi et al. | 178/5.4 CD |
| 3,764,731 | 10/1973 | Parker | 178/5.4 CD |
| 3,812,525 | 5/1974 | Hilbert | 358/7 |

*Primary Examiner*—Bernard Konick
*Assistant Examiner*—Alan Faber
*Attorney, Agent, or Firm*—Webb, Burden, Robinson and Webb

[57] ABSTRACT

A system for recording and reproducing two kinds of signals, for example, two chroma signals for color television reproduction, comprising a recorder, a recording medium and an apparatus for reproducing said chroma signals from the recording medium. The recorder records the two types of signals on the recording medium alternately in the direction of the horizontal scan without the variation range of either signal overlapping that of the other and also the recorder records at least one standard level signal such as the separation level signal and/or center level signals of said two kinds of signals at the initial and/or terminal part of said horizontal scan. The apparatus for reproducing the original signals from the recording medium includes circuits for fixing the separation level and/or the center levels of the two kinds of signals from the standard level signal information on the recording medium.

29 Claims, 40 Drawing Figures

SYSTEM FOR RECORDING AND REPRODUCING PICTURE SIGNALS WITH AMPLITUDE REFERENCE SIGNALS

This invention relates to a system for recording and reproducing a signal such as a television picture signal, especially a color picture signal. The signal is recorded in monochrome on a recording medium, for example, photographic film. The device for recording may include, for example, a raster scanning energy beam, for example, an electron beam.

In the art of recording a television picture signal, especially a color picture signal, on photographic film and the like in the form of a monochrome image by using an electron beam or other type energy beam and reproducing an original color picture signal from said monochrome image, several systems are known.

According to one system, the color picture signal is divided into a brightness signal and two kinds of color signals as in the case of the (R-Y) and (B-Y) signals in the NTSC (National Television Systems Standards) system. In this case, the brightness signal is recorded in brightness frames, as it is, while the two kinds of color signals are recorded in the color frames after being alternately extracted (a technique hereinafter referred to as "sampling") by using a higher frequency (e.g., 1 MHz) than the horizontal scanning frequency (15.75 KHz).

In order to reproduce an original color picture signal from the medium of the above recording system, the spot beam of a flying spot scanner, driven at the same frequency as the recording frequency, is split into two beams by an optical prism, one of which is for raster scanning the brightness frame, the other being used for raster scanning the color frame. The photo signals obtained from the respective frames are then converted into electrical signals and recomposed into a color picture signal. In this case, in order to separate and reproduce the two kinds of color signals without color errors, sampling must be accurately synchronized with that of the recording. However, due to the fact that the sampling frequency is extremely high, not to mention slight irregularities in the film drive mechanism, it is very difficult to produce color signals having no color errors.

Accordingly, different center level signals are added to the respective color signals prior to sampling and recording said color signals. For example, if the recording density range of the photographic film is 0-10, the said range is utilized by the two kinds of signals so that the variation ranges of the recording densities attributable to the two kinds of signals do not overlap. Thus, a center level signal corresponding to a recording density of 7.5 is added to the color signal (R-Y) so as to utilize the 5–10 range, while a center level signal corresponding to a recording density of 2.5 is added to the color signal (B-Y) so as to utilize the 0–5 range. Consequently, in order to separate and reproduce the two kinds of color signals recorded on a recording medium in accordance with the above system, the color frame is raster scanned by a flying spot scanner, the resultant signal is phase inverted and the upper and lower envelopes of the signal waveform are detected as the (R-Y) and (B-Y) signals respectively. In this way, inerrant color signals are reproduced with a reasonable degree of ease.

In such a system, however, since the separation level voltage of the two signals is determined by the voltage corresponding to a recording density of 5 and the center voltages (zero signal levels) of the two signals are determined by the voltages corresponding to recording densities of 7.5 and 2.5 respectively, the separation level and the center levels of the reporduced signals often change, due to poor adjustment, irregularities in the developing process of the photographic film or other recording medium and variations in the intensity of the reproducing beam. As a result, it is constantly necessary to adjust the separation level and/or the center levels which is very complicated and time consuming. Furthermore, in most cases, this adjustment is impossible because the variation intensity of the levels is too rapid. Consequently, a sharp image having no color error cannot be obtained by the aforesaid system.

An object of the present invention is to provide an apparatus for alternately recording two kinds of picture signals in the horizontal scanning direction of a raster so that the variation ranges of their recording densities do not overlap, and also for recording at least one standard level of the recording density on the recording medium.

Another object of the present invention is to provide a recording medium carrying two kinds of picture signals and at least one standard level signal wherein the picture signals are alternately recorded in the transverse direction without overlapping the ranges of the recording densities of said picture signals and the standard level signal or signals are recorded at the initial and/or the terminal part of the scan.

A further object of the present invention is to provide an apparatus for reproducing original picture signals, said apparatus including circuits for fixing the separation level of the two kinds of signals and/or the center levels of the respective signals by using signals detected by the aforesaid recording medium.

These and other objects and features of this invention will become more readily apparent by reading through the following detailed description in conjunction with the accompanying drawings in which:

FIG. 2(*b*) is a partial enlarged view of a recording medium whereon standard signals comprising both separation level and center level signals are recorded by the apparatus shown in FIG. 1;

FIG. 2(*c*) is a partial enlarged view of a recording medium whereon the picture signals and a single standard level signal are recorded by another apparatus according to this invention;

FIG. 2(*d*) is a partial enlarged view of a medium whereon center level signals of two kinds of picture signals are alternately recorded by another apparatus according to this invention;

Figure 1:
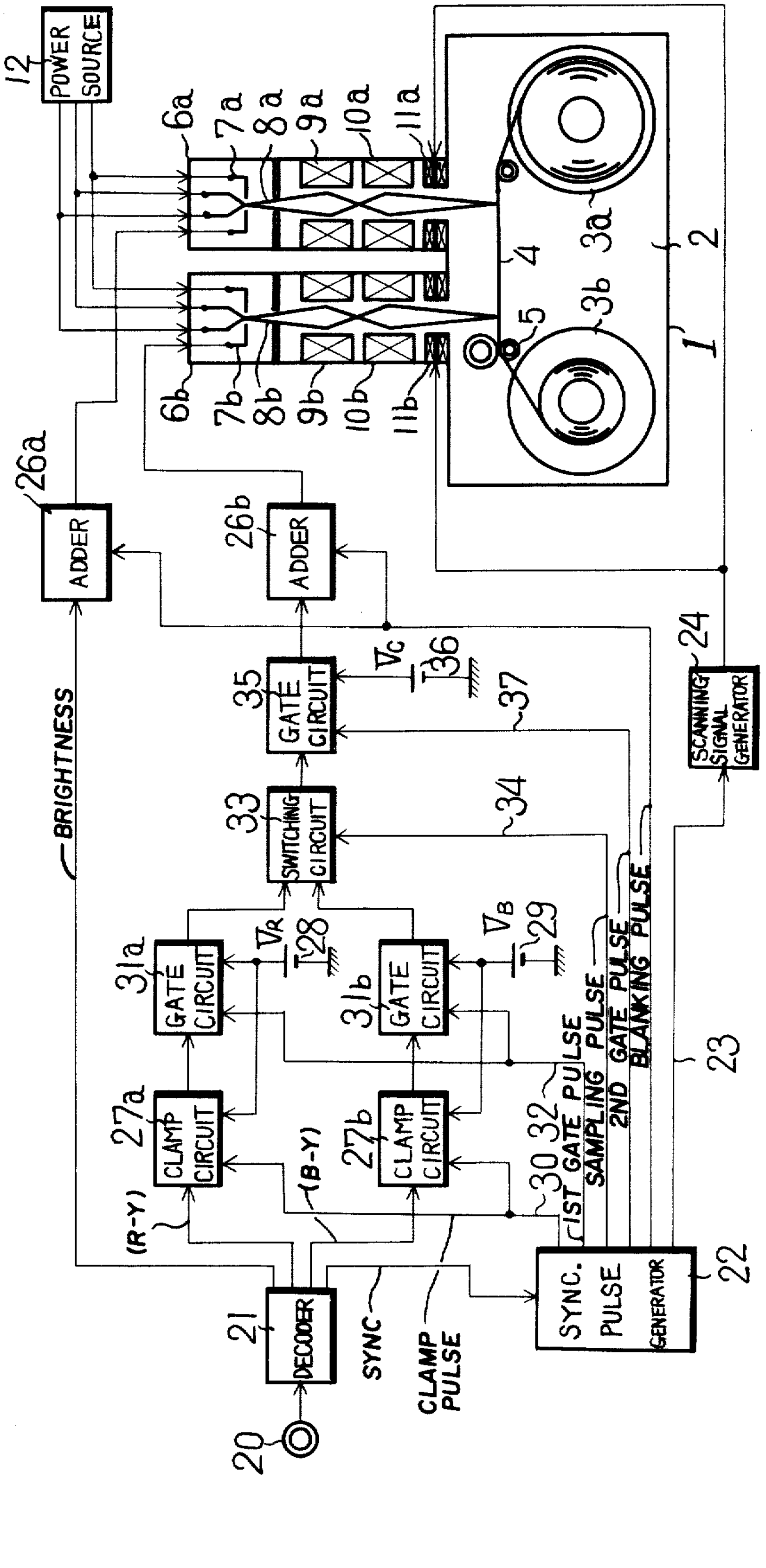
FIG. 1 is a block schematic showing one embodiment of a recording apparatus according to this invention.
Figure 2A:
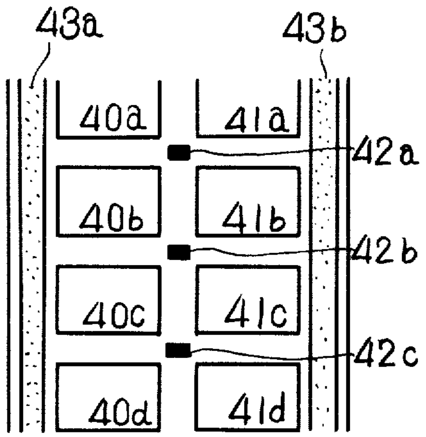
FIG. 2(*a*) is a partial view of a recording medium whereon signals are recorded by an apparatus according to this invention.
Figure 2B:
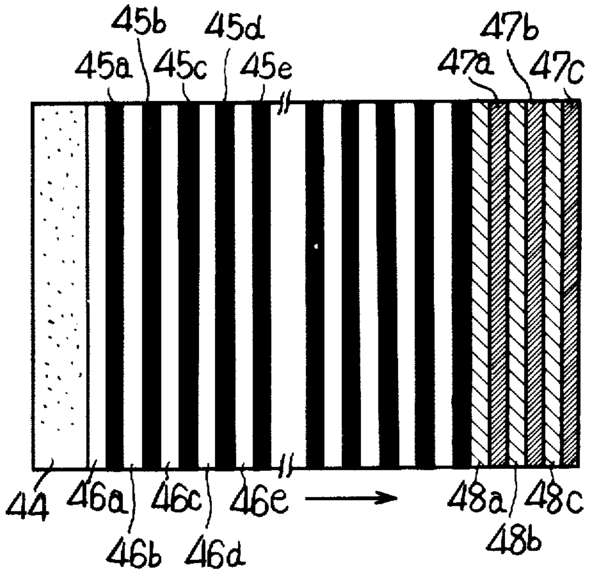
Figure 2C:
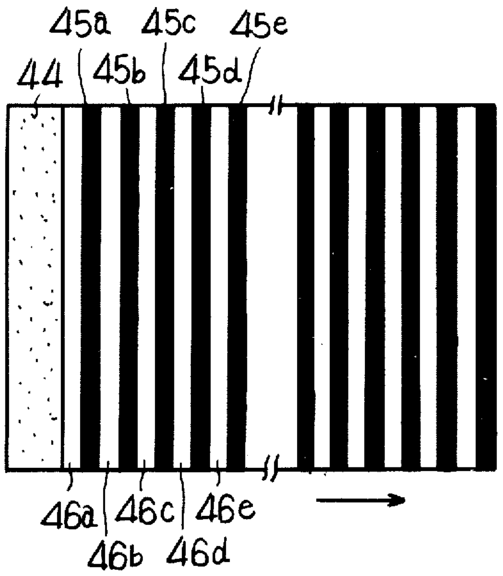
Figure 2D:
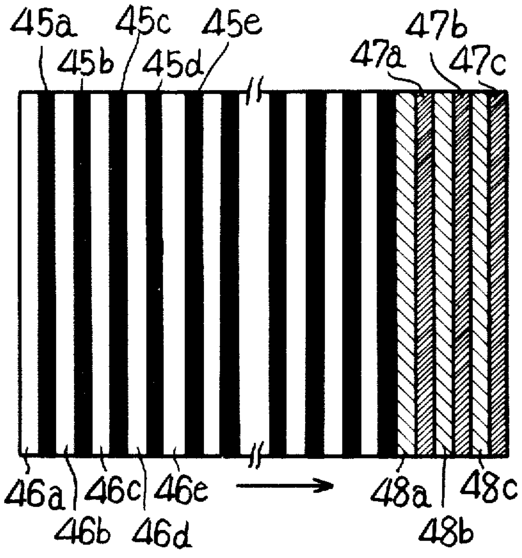
Figures 3A, 3B, 3C, 3D, 3E, 3F, 3G, 3H, 3I:
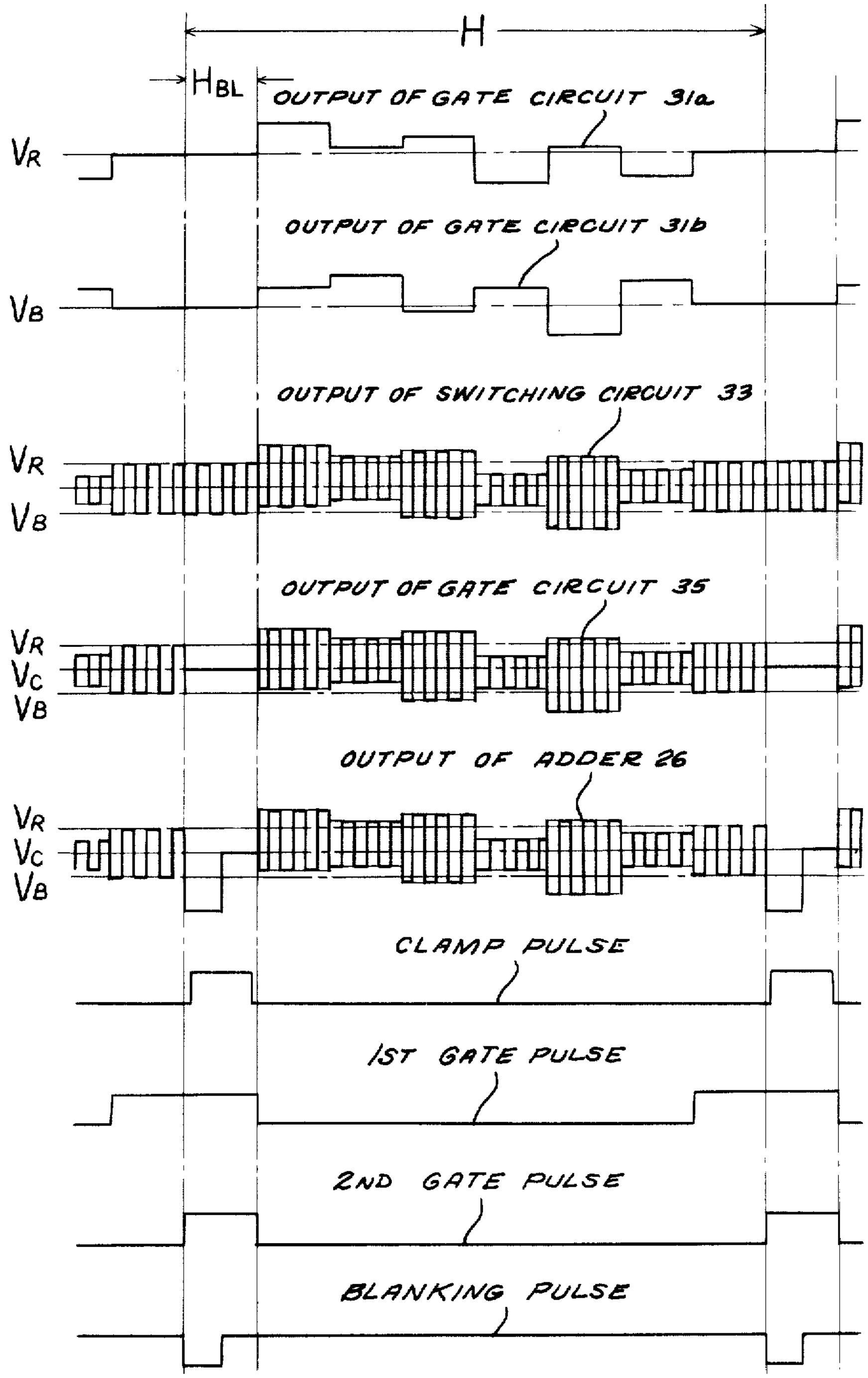
Figure 4:
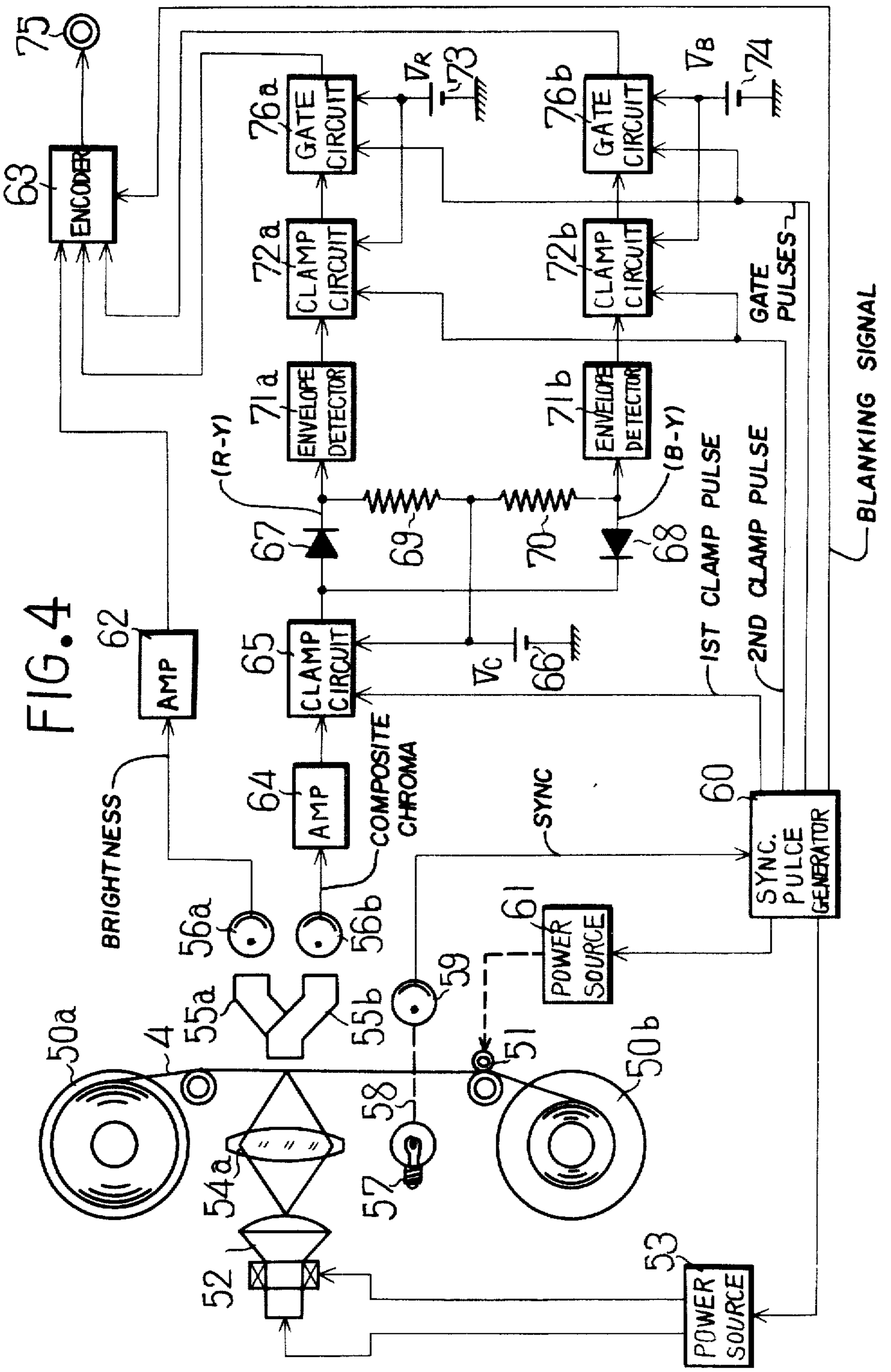
Figures 5A, 5B, 5C, 5D, 5E, 5F:
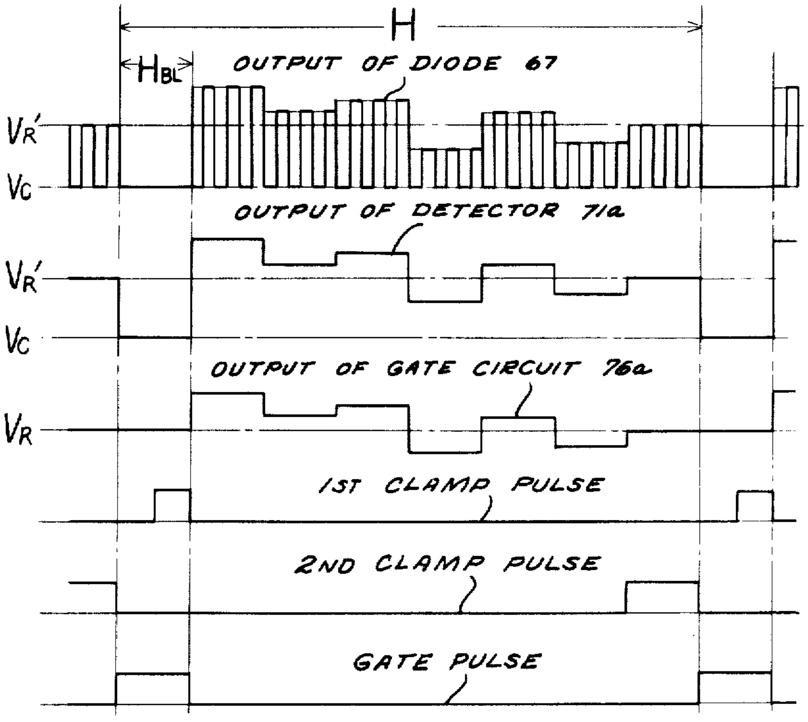
Figure 7:
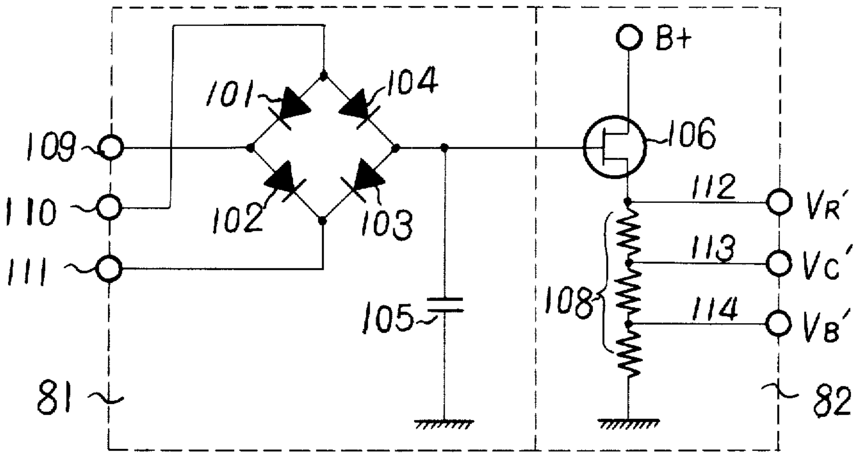
Figure 6:
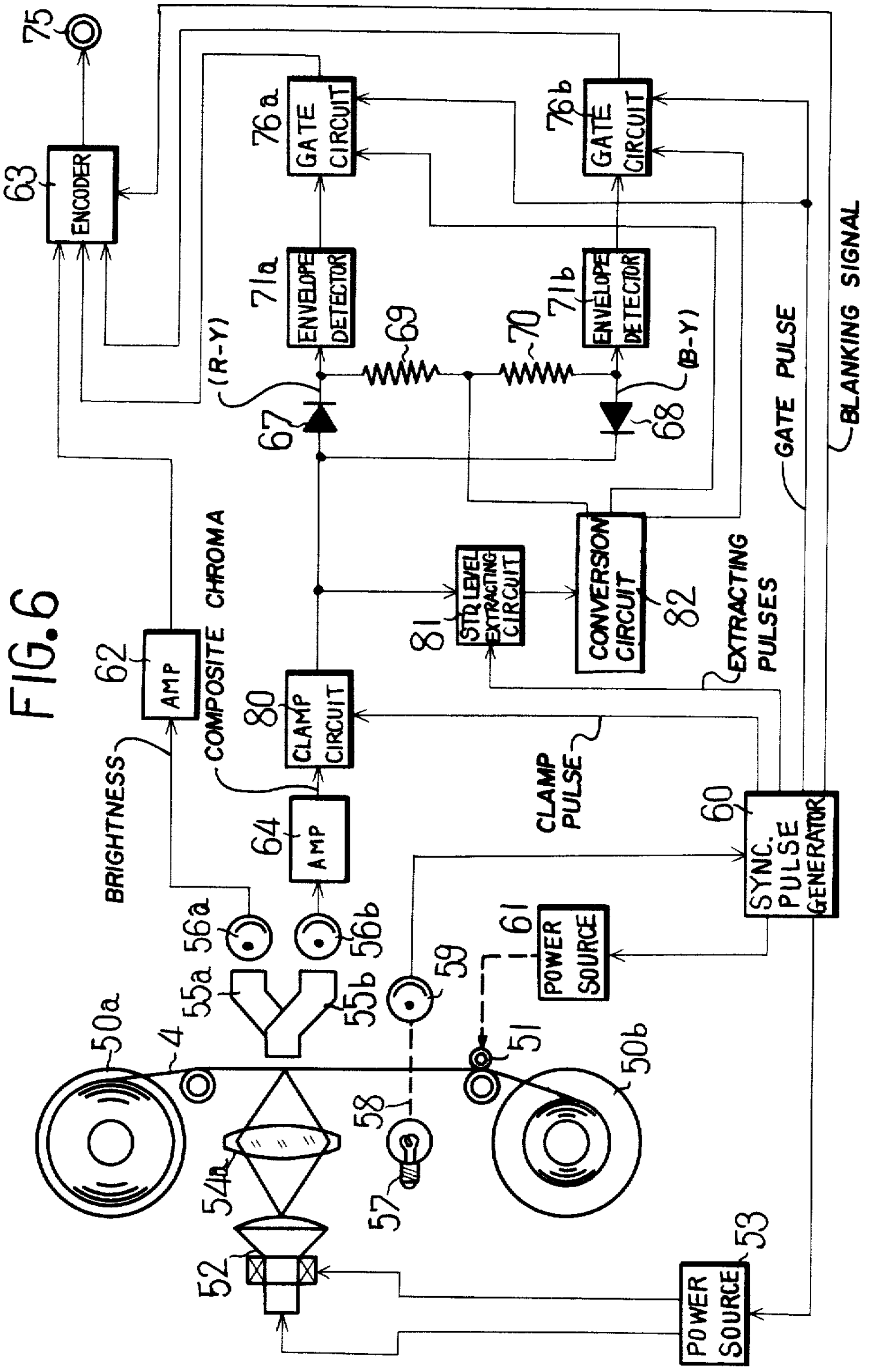
Figures 8A, 8B, 8C, 8D, 8E, 8F, 8G:
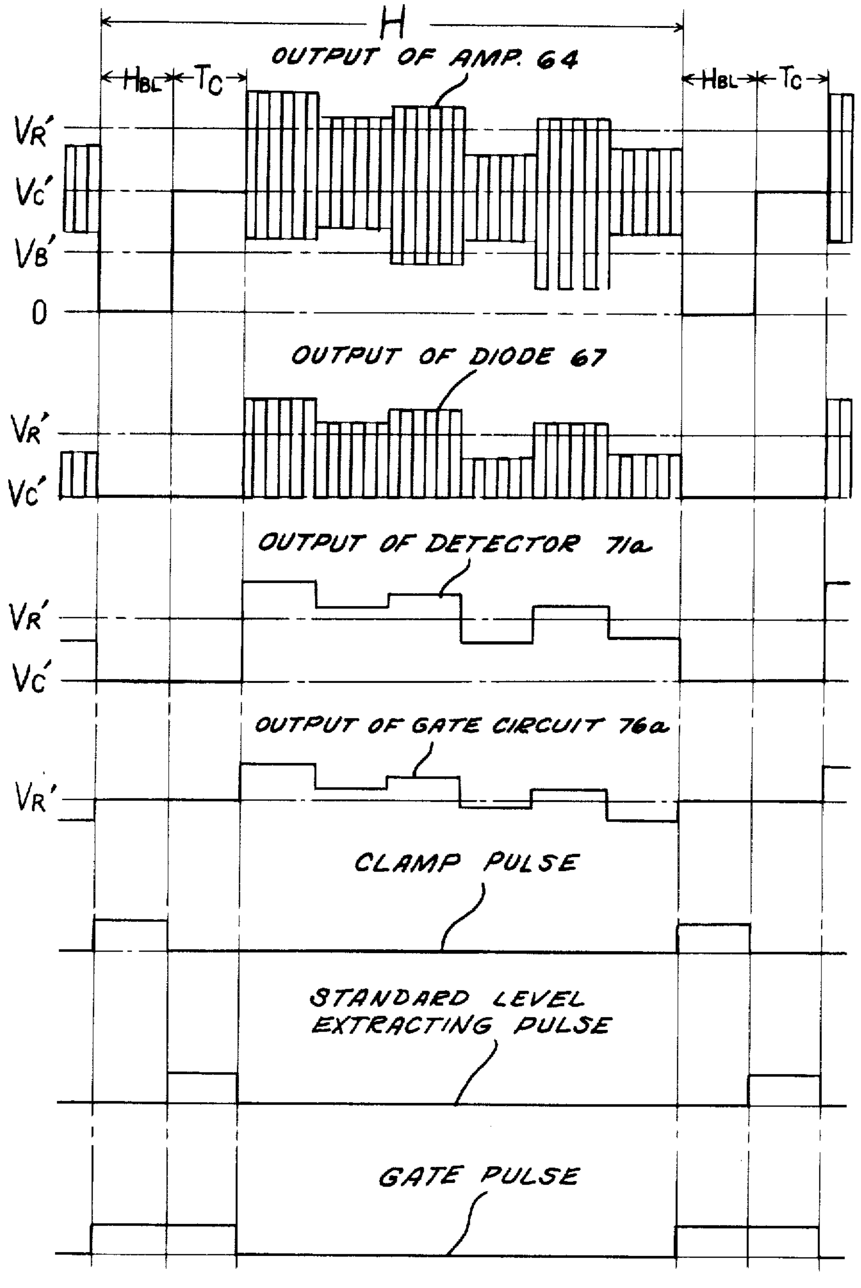
Figure 9:
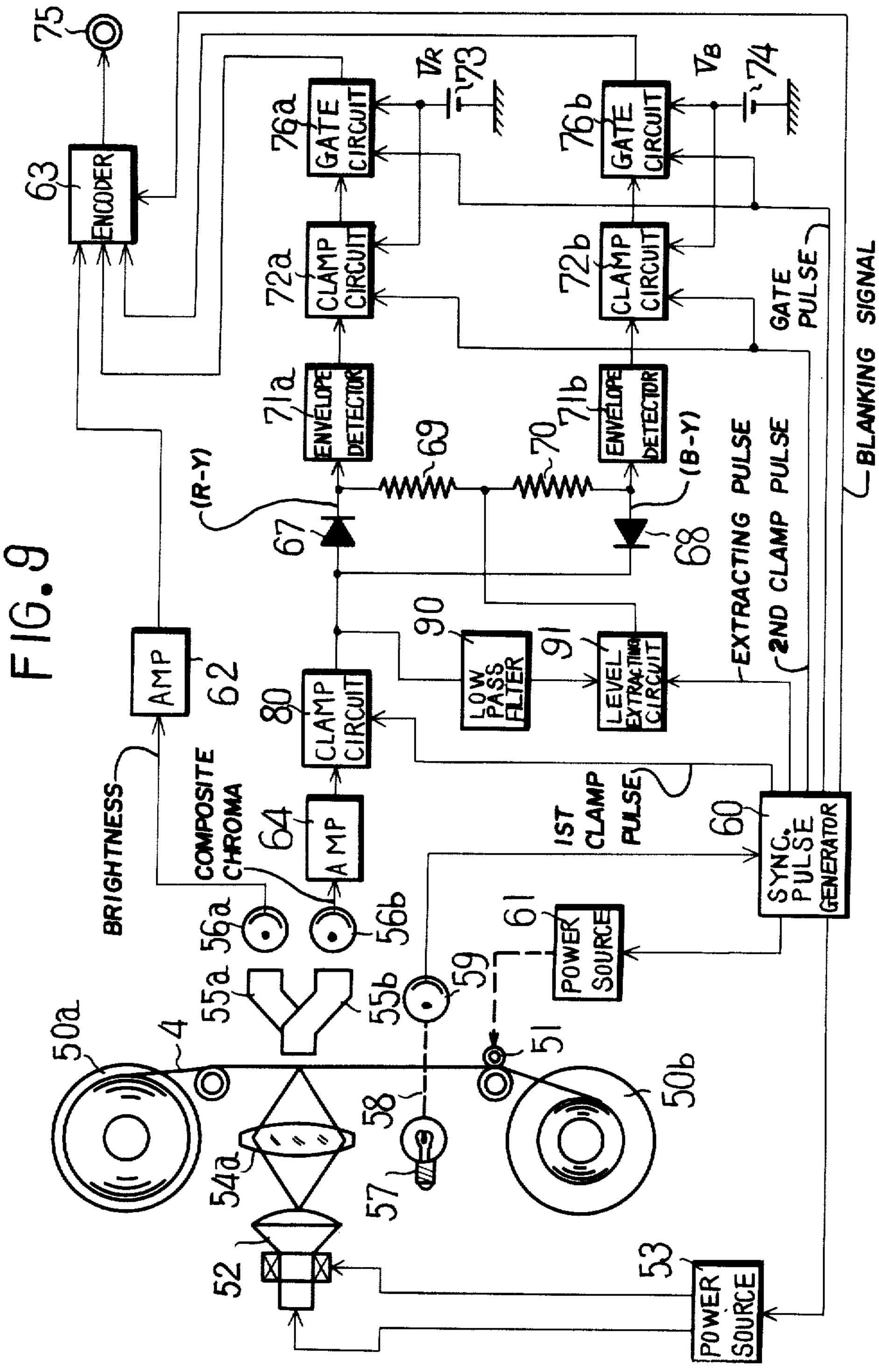
Figure 10:
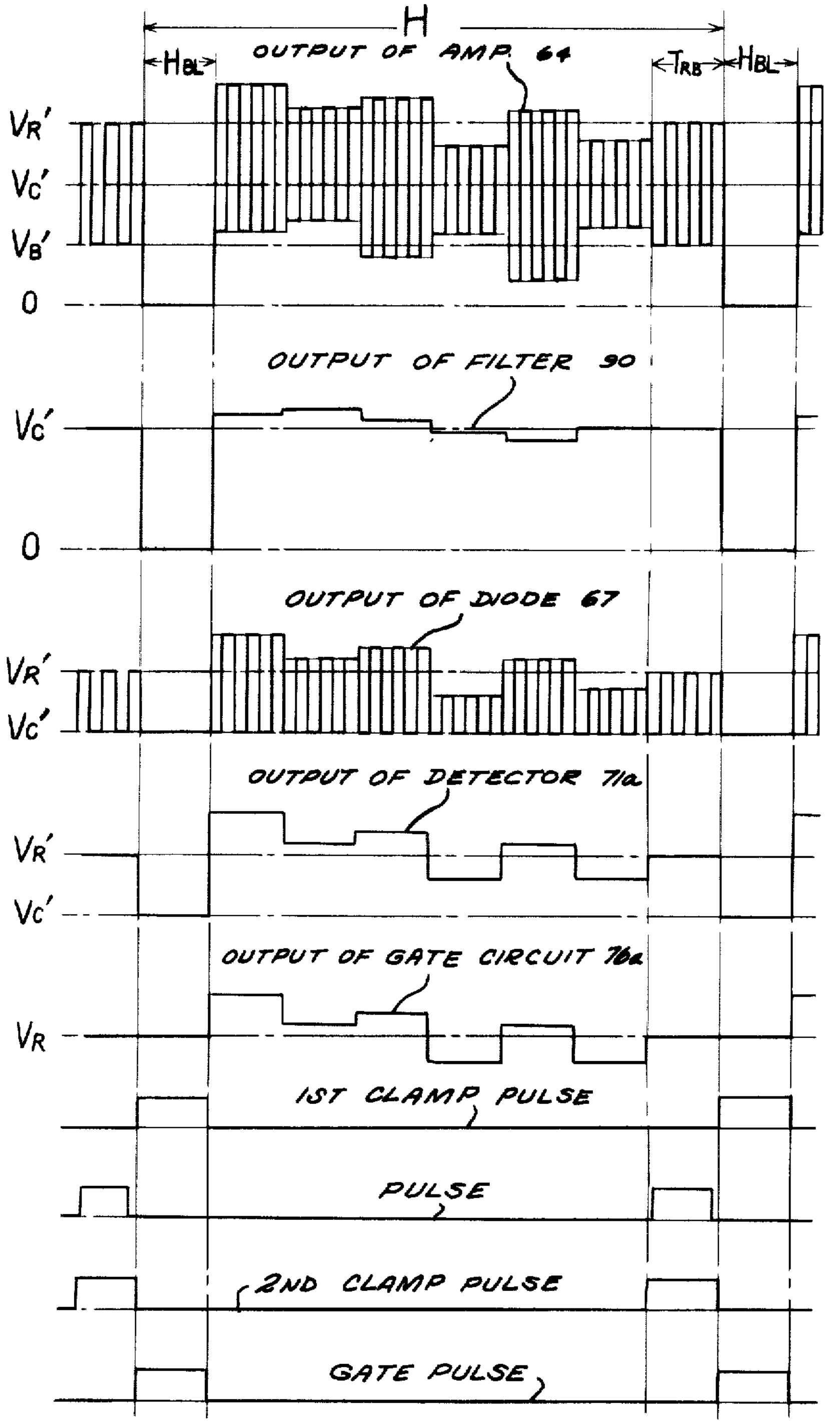

FIGS. 3(*a*) to 3(*i*) are diagrams showing transformed shapes of signals to be recorded by the apparatus shown in FIG. 1;

FIG. 4 is a block schematic showing an embodiment of an apparatus for reproducing the original picture signals recorded on the recording medium shown in FIG. 2(*b*);

FIGS. 5(*a*) to 5(*f*) are diagrams showing signal shapes of respective parts of the reproducing apparatus shown in FIG. 4;

FIG. 6 is a block schematic showing an embodiment of an apparatus for accurately reproducing the original picture signals recorded on the recording medium shown in FIG. 2(*c*);

FIG. 7 is a circuit disgram of the standard level extracting circuit 81 and conversion circuit 82 used in the reproducing apparatus shown in FIG. 6;

FIGS. 8(*a*) to 8(*g*) are diagrams showing signal shapes of respective parts of the reproducing apparatus shown in FIG. 6;

FIG. 9 is a block schematic showing an embodiment of an apparatus for accurately reproducing the original picture signals extracted from the recording medium shown in FIG. 2(*d*); and FIGS. 10(*a*) to 10(*i*) are diagrams showing signal shapes of respective parts of the reproducing apparatus shown in FIG. 9.

RECORDING

Referring to FIG. 1, the beam recording apparatus proper 1 is evacuated to a high vacuum by means of a vacuum pump (not shown). In the recording chamber 2 of said recording apparatus 1 are provided a supply reel *3a* and a take-up reel *3b* onto which a beam sensitive recording medium 4, such as photographic film is wound, and a motor drive mechanism 5 which moves said recording medium 4 continuously and intermittently.

Columns 6*a* and 6*b* generate electron beams. Each column is provided with an electron gun *7a*, *7b* respectively, from each of which an electron beam 8*a*, *8b* is emitted, said beams irradiating said recording medium 4 after being condensed or focused by electron lenses 9*a*, 9*b* and 10*a*, 10*b* and raster scanned by deflecting coils 11*a* and 11*b*. The electron gun power source 12 supplies the negative high voltage to the gun cathodes in addition to providing said cathodes with heating current. Also, when picture image signals as described hereafter are applied to the gun control electrodes, a fixed bias voltage is applied to said electrodes so as to generate electron beams which correspond to the intensity of said picture image signals. Although columns 6*a* and 6*b* appear in the drawing as if the electron beams 8*a* and 8*b* irradiate positions spaced longitudinally on recording medium 4, they are, in actual fact, arranged so that the beams irradiate positions spaced transversely on said medium. Furthermore, picture signals can be recorded at different positions transversely on the recording medium.

An NTSC color picture signal generated by a color television camera, a video tape recorder or the like is fed into a decoder 21 via an input terminal 20, where it is broken down into a brightness signal, two kinds of color signals and a synchronizing signal. The synchronizing signal is supplied to a synchronizing pulse generator 22 which generates horizontal and vertical synchronizing signals, a clamp pulse (FIG. 3(*f*)), a first gate pulse (FIG. 3(*g*)), a sampling pulse, a second gate pulse (FIG. 3(*h*)), and a blanking signal (FIG. 3(*i*)) in accordance with the color picture input signal. The horizontal and vertical synchronizing signals are supplied to a scanning signal generator 24 via a conductor 23, the output of which is supplied to deflecting coils 11*a* and 11*b* as a 15.75 KHz horizontal scanning input signal and a 60 Hz vertical scanning signal, in order to scan electron beams 8*a* and 8*b* on the recording medium 4. At the same time, the aforementioned blanking signal is supplied to adders 26*a* and 26*b* which receive a brightness signal and two kinds of color signals (R-Y) and (B-Y) from the decoder respectively.

The output signal of the adder 26*a* is applied to the control electrode of the electron gun 7*a*. Accordingly, the electron beam 8a emitted from said gun is controlled by the intensity of the signal from the adder 26*a*.

The resultant brightness frames 40*a*, 40*b*, 40*c* .... recorded on the recording medium 4 are shown in FIG. 2(*a*).

The two kinds of color signals (R-Y) and (B-Y) from the decoder 21, prior to reaching the adder 26*b*, are fed into clamp circuits 27*a* and 27*b* respectively. At the same time, voltages $V_R$ and $V_B$ corresponding to the desired respective center levels of said color signals are applied to the clamp circuits from power sources 28 and 29 respectively. Therefore, if a clamp pulse (FIG. 3(*f*)) is applied to the clamp circuits from the generator 22 via conductor 30 during the horizontal scanning blanking period $H_{BL}$, the voltages $V_R$ and $V_B$ are clamped by the respective clamp circuits and said voltages are added to the color signals (R-Y) and (B-Y).

In this case, if the recording density range of the recording medium is 0-10, the color signal center level voltages $V_R$ and $V_B$ are determined by the voltages corresponding to recording densities 7.5 and 2.5 and the amplitudes of the color signals (R-Y) and (B-Y) are presuppressed so as to keep them within the ranges, 5–10 and 0–5 respectively. The color signals (R-Y) and (B-Y), including the added center level voltages, are then fed into gate circuits 31*a* and 31*b* respectively. Again, if a first gate pulse IFIG. 3(*g*)) is applied to said gate circuits 31*a* and 31*b* via a conductor 32, the gate circuits operate so as to cut off the input signals allowing only the voltages $V_R$ and $V_B$ to pass through to switching circuit 33.

Accordingly, the outputs of said gate circuits 31*a* and 31*b* include the center level voltages $V_R$ and $V_B$ in the terminal part and blanking period $H_{BL}$ of the horizontal scanning respectively, while the color signals (R-Y) and (B-Y) which vary about the voltages $V_R$ and $V_B$ as their respective centers, are included in the remaining part of the scanning period (see FIGS. 3(*a*) and 3(*b*).

Moreover, since a sampling pulse of about 1 MHz is applied to said switching circuit 33 from the synchronizing pulse generator 22 via a conductor 34, the color signals (R-Y) and (B-Y) as shown in FIGS. 3(*a*) and 3(*b*), are alternately sampled and transformed into a composite signal, whose upper and lower envelopes represent the color signals (R-Y) and (B-Y) respectively, as shown in FIG. 3(*c*).

The composite signal, thus produced, is fed into a gate circuit 35. At the same time, separation level voltage Vc corresponding to a recording density of 5 is applied to said gate circuit 35 by a power source 36. As a result, if a second gate pulse (FIG. 3(*h*)) is applied to the gate circuit via a conductor 37, the composite signal is cut off and only the separation level voltage Vc passes through to the adder 26*b*. Accordingly, as shown in FIG. 3(*d*), the output of the gate circuit 35 includes the separation level voltage Vc in the horizontal blanking period $H_{BL}$.

Once in the adder 26*b*, the various signals, including the blanking signal from generator 22 (FIG. 3(*i*)), are added and the composite output comprising the blanking signal, the separation level signal, the alternately sampled signal of the (R-Y) and (B-Y) signals and two kinds of center level signals having voltages $V_R$ and $V_B$ respectively (FIG. 3(*e*)) is applied to the control electrode of the electron gun 7*b*. Accordingly, the electron beam 8*b* emitted from said gun is controlled by the intensity of the composite signal.

The resultant color frames 41*a*, 41*b*, 41*c*, 41*d* .... recorded on the recording medium 4 are shown in FIG. 2(*a*).

FIG. 2(*b*) shows an enlarged view of color frame 41*d*, the arrow indicating the direction of scan. In the figure the separation level 44 recording portion whose recording density is 5 corresponding to $V_C$ as shown at the left, next to the right come the (R-Y) and (B-Y) color signal recording portions 45*a*, 45*b*, 45*c* and 46*a*, 46*b* and 46*c* respectively appearing alternately and finally to the far right in the latter part of the scanning period come the (R-Y) and (B-Y) center level recording portions 47*a*, 47*b* and 47*c* whose recording density is 7.5 corresponding to $V_R$ and 48*a*, 48*b* and 48*c* whose recording density is 2.5 corresponding to $V_B$ respectively.

It will be noted in FIG. 2(*b*) that the recording portions are orientated at right angles to the horizontal scanning direction. This is to facilitate reproduction tracking, since the sampling order of the signals (R-Y) and (B-Y) sampled by the switching circuit 33 is the same from scan to scan, due to the fact that the recording apparatus according to this invention is designed so as to generate sampling pulses with the same phase between one scan and another.

Referring again to FIG. 2(*a*), 42*a*, 42*b* and 42*c* represent synchronizing indicia recorded during the vertical blanking periods and 43*a* and 43*b* represent sound tracks recorded by an optical or magnetic means, not shown.

In a second embodiment the circuit for the recorder is as described with reference to FIG. 1, but with the gate circuits 31*a* and 31*b* removed and the center level signals corresponding to $V_R$ and $V_B$ are eliminated so that the enlarged view of color frame 41*d* becomes as shown in FIG. 2(*c*). That is to say, the (R-Y) and (B-Y) center level signals are not recorded.

If an original picture signal is reproduced from such a recording medium utilizing the reproducing apparatus shown in FIG. 6(to be described hereafter), the signal derived from the power source 36 does not of necessity have to be determined by the separation level voltage $V_C$; in fact, any voltage whose level corresponds to one recording density among the range 0–10 can be used.

In other words, in the apparatus shown in FIG. 6, a separation level voltage $V'_C$, a (R-Y) signal center level voltage $V'_R$ and a (B-Y) signal center level voltage $V'_B$ are produced by a conversion circuit in accordance with the separation level signal extracted from the signal detected by the photomultiplier 56*b*. Therefore, a signal of any level can be used as the standard level of the recording density simply by adjusting the conversion ratio between the respective voltages. Accordingly, the separation level recording portion 44 shown in FIG. 2(*c*) is replaced by a standard level recording portion corresponding to one recording density.

In a third embodiment the circuit for the recorder is as described in FIG. 1, except the gate circuit 35, removed, and the separation level signal corresponding to $V_C$ is eliminated. As a result, the enlarged view of color frame 41*d* is shown in FIG. 2(*d*). That is to say, the separation level signal is not recorded. FIG. 9 is a reproducing device for recovering the signals from the recording mediums as shown in FIG. 2(*d*).

REPRODUCING-FIRST EMBODIMENT

FIGS. 4 and 5 are related to an embodiment of an apparatus for reproducing picture signals from the recording medium shown in FIG. 2(*a*), especially as recorded in FIG. 2(*b*). In FIG. 4, 50*a* and 50*b* are supply and take-up reels respectively. A recording medium 4 which bridges the two reels is continuously moved by a capstan 51 or the like. A flying spot tube 52 is controlled by a power source 53. The scanning electron beam in the flying spot tube has a constant intensity and is raster scanned at the same frequency as electron beams 8*a* and 8*b* described in FIG. 1; namely, at a horizontal scanning frequency of 15.75 KHz and a vertical scanning frequency of 60 Hz. The rays displayed on the fluorescent screen of said flying spot tube 52 are focused on the recording medium 4 by a condenser lens 54*a* and a second condenser lens 54*b* (not shown). The focused rays then raster scan the recording medium 4 in unison with the scanning of the electron beam in the flying spot tube 52. In this case, the rays transmitted through lens 54*a* scan the inside of the brightness frame (see FIG. 2(*a*)), while the rays transmitted through lens 54*b* scan the inside of the color frame. As the respective rays are transmitted through the recording medium, their intensity varies according to the recording density of the portion of the recording medium through which the rays are transmitted. Thus, the transmitted light rays, after passing through light guides 55*a* and 55*b*, are converted by photomultipliers 56*a* and 56*b* into electrical signals whose intensity corresponds to the intensity of said transmitted light rays.

In the meantime, a continuous light beam 58 emitted from a light source 57 irradiates the approximate longitudinal center of the recording medium 4, after which synchronizing indicia 42*a*, 42*b*, 42*c*, .... shown in FIG. 2(*a*) are detected and converted by a photomultiplier 59 into a train of pulses which are supplied to a synchronizing pulse generator 60. The generator 60 generates synchronizing signals which are supplied to the power source 53 of the flying spot tube 52 and the power source 61 of the capstan 51 respectively plus a first clamp pulse (FIG. 5(*d*)), a second clamp pulse (FIG. 5(*e*)), a gate pulse (FIG. 5(*f*)), and a blanking signal in accordance with the input pulses from the photomultiplier 59.

A brightness signal detected by the photomultiplier 56*a* is fed into an encoder 63 via an amplifier 62, while a color signal detected by the photomultiplier 56*b* is fed into a clamp circuit 65 via an amplifier 64.

Since voltage $V_C$ corresponding to the separation level is supplied to said clamp circuit 65 by a power source 66, the separation level is accurately clamped to $V_C$, so long as the first clamp pulse (FIG. 5(*d*)), is fed into the circuit during the time the signal from the separation level is being introduced into the input signal; in other words, during the period corresponding to the initial part of the horizontal scanning. Accordingly, even if the recording density of the separation level is changed while the recording medium is being developed, the level required to separate the composite color signal, made up of the two kinds of color signals, remains clamped to voltage $V_C$.

Said composite color signal is then applied to a separation circuit consisting of diodes 67 and 68, which are biased at voltage $V_c$ by the power source 66, and resistors 69 and 70.

Consequently, the signal which passes through diode 67 (i.e., the color signal (R-Y)) has a level higher than that of voltage $V_c$, and the signal which passes through diode 68 (i.e., the color signal (B-Y)) has a level lower than that of voltage $V_c$.

The color signal (R-Y) passed through said diode 67 having a waveform as shown in FIG. 5(*a*), then passes into an envelope detector 71*a*which removes the carrier wave (in this case, the approx. 1 MHz sampling frequency) leaving simply an envelope as shown in FIG. 5(*b*). Next, the output of the envelope detector 71*a* is fed into a second clamp circuit 72*a*. *Since voltage* $V_R$ corresponding to the center level of the color signal (R-Y) is supplied to the clamp circuit 72*a* by a power source 73, the center level is clamped to $V_R$, so long as the second clamp pulse (FIG. 5(*e*)) is fed into said clamp circuit from the synchronizing pulse generator 60 during the period corresponding to the terminal part of the horizontal scanning.

Now, since the output of the clamp circuit 72*a* contains no color signal, the standard signal to be used in the encoder 63 for composing the NTSC color signal by utilizing the phase difference is lost during the horizontal blanking period. Consequently, the output of said clamp circuit is supplied to gate circuit 76*a*, to which voltage $V_R$ is supplied by power source 73, and when a gate pulse (FIG. 5(*f*)) is fed into said gate circuit, voltage $V_R$ is introduced into the output.

Therefore, the output of the gate circuit 76*a* becomes the color signal (R-Y) with voltage $V_R$ as the center level (0 levels) as shown in FIG. 5(*c*) which is accurately reproduced during one horizontal scanning period including the blanking period. The reproduced color signal (R-Y), after having its DC component removed by condenser or the like, is supplied to the encoder 63.

In the meantime, the color signal (B-Y) separated by the aforesaid diode 68 in the same way as the color signal (R-Y), is transformed into an accurately reproduced color signal (B-Y) by passing it through envelope detector 71*b*, and clamp circuit 72*b* and gate circuit 76*b* to which voltage $V_B$ corresponding to the center level voltage of the color signal (B-Y) are supplied by a power source 74. The reproduced color signal (B-Y) is then fed into the encoder 63. As mentioned above, the brightness signal, the color signals (R-Y) and B-Y) and, furthermore, the blanking signal generated by the synchronizing pulse generator 60, are applied to the encoder 63, in order to recompose the NTSC television signal which is supplied to the output terminal 75 for direct connection to a television monitor, or monitors, or the like.

REPRODUCING-SECOND EMBODIMENT

FIGS. 6, 7 and 8 relate to an apparatus for reproducing an accurate signal from the recording medium shown in FIG. 2(*c*).

A composite color signal detected by photomultiplier 56*b* is supplied to a clamp circuit 80 via amplifier 64. FIG. 8(*a*) shows said clamp circuit input signal. It will be noted that a single scanning period H is composed of a horizontal blanking period $H_{BL}$, a period $T_c$ which includes a signal from the separation level recording portion 44 (see FIG. 2(*c*)) and a period including the two kinds of color signals. If a clamp pulse with a time sequence as shown in FIG. 8(*e*) is applied to the clamp circuit during the horizontal blanking period $H_{BL}$, the input signal is clamped and fixed to a constant level even if the center level fluctuates. Part of the output signal of said clamp circuit 80 is then fed to a standard level extracting circuit 81, wherein the signal from the separation level recording portion 44 recorded on the recording mediumf 4 is extracted. The extracted signal is then fed into a conversion circuit 82, wherein the voltage $v'_c$ for separating the two kinds of color signals (R-Y) and (B-Y) and voltage $V'_R$ and $V'_B$ corresponding to the center levels of the respective signals are produced.

An embodiment of the standard level extracting circuit 81 and conversion circuit 82 is shown in FIG. 7. The circuits, comprising four diodes 101, 102, 103 and 104 in bridge form, a condenser 105, field-effect transistor 106 and a tapped resistor 108, are designed so that when the output of the clamp circuit 80 is applied to the input terminal 109 and the standard level extracting pulses generated by the synchronizing pulse generator 60 during the period $T_c$ of said output (FIG. 8(*f*)) are applied to terminals 110 and 111, the signal from the separation level recording portion charges up condenser 105. In addition, since the standard level extracting pulses are timed so as to appear simultaneously and in antiphase only when a positive and a negative pulse are fed into terminals 110 and 111 respectively, the diodes become conductive, thereby eliminating, in effect, the high impedance between input terminal 109 and condenser 105, during said period $T_c$. During the remaining part of the scanning period H the diodes are nonconductive, thereby effecting a high impedance between input terminal 109 and condenser 105.

The charge built up in condenser 105 is maintained for more than the duration of one scanning period H by means of a time constant which is determined by the capacity of condenser 105 and the combined parallel resistance of the following circuits. Thus, the condenser charge voltage is applied to the gate electrode of the field-effect transistor 106 during the period determined by the said time constant and, as a consequence thereof, a constant voltage B, also applied to said transistor 106, is controlled by said charge voltage during said period and accurately divided into voltages $V'_R$, $V'c$ and $V'_B$, corresponding to recording densities 7.5, 5 and 2.5, in accordance with predetermined voltage ratios, said voltages appearing as output voltages at terminals 112, 113 and 114 respectively. Voltage $V'c$ for separating the composite color signal made up of the two kinds of color signals is fed into a separation circuit consisting of diodes 67 and 68, and resistors 69 and 70, so that the separation level of the two kinds of color signals is clamped to $V'c$. Therefore, as in the case of the first embodiment shown in FIG. 4, the output of the clamp circuit 80 is accurately divided into two color signals so that the signal (R-Y) having a level higher than the voltage $V'c$ passes through diode 67 and the (B-Y) signal having a level lower than the voltage $V'c$ passes through diode 68.

The signal (R-Y) passed through said separation circuit whose waveform is shown in FIG. 8(*b*) is detected and the waveform is transformed as shown in FIG. 8(*c*) by the envelope detector 71*a*.

In this embodiment, since the color signals are devoid of center level signals, the above detected signal is applied directly to gate circuit 76$a$ without passing it through a clamp circuit. In said gate circuit, during the time a gate pulse as shown in FIG. 8($g$) is fed from the synchronizing signal generator 60 to said gate circuit 76$a$; that is to say, during periods $H_{BL}$ and $T'c$, the voltage $V'_R$ corresponding to the center level is introduced into the detected signal. As a result, the waveform is transformed as shown in FIG. 8($d$) and the resultant signal is fed into encoder 63.

In the meantime, the voltage $V'_B$ is similarly introduced into the color signal (B-Y) by gate circuit 76$b$, after passing through diode 68 and envelope detector 71$b$, and the resultant signal is fed into encoder 63.

Consequently, by employing the apparatus shown in FIG. 6 in order to reproduce the two kinds of color signals from the recording medium shown in FIG. 2($c$), the color signals can be accurately separated, regardless of irregularities in the film developing process, so that color signals whose voltages $V'_R$ and $V'_B$, corresponding to the respective center levels, can be faithfully reproduced.

REPRODUCING-THIRD EMBODIMENT

FIGS. 9 and 10 relate to an apparatus for reproducing an accurate signal from the recording medium shown in FIG. 2($d$): i.e., the recording medium on which the respective center level signals were recorded in the initial or terminal parts of the horizontal scanning.

A composite color signal detected by photomultiplier 56$b$ is supplied to amplifier 64 wherein it is amplified up to a predetermined level. FIG. 10($a$) shows the waveform of said amplified signal. It will be noted in the figure that a single horizontal scanning period H is composed of a blanking period $H_{BL}$ containing no signal, a period in which color signals (R-Y) and (B-Y) exist alternately and a period $T_{RB}$ in which voltages $V'_R$ and $V'_B$ corresponding to the respective center levels exist alternately. Said voltages $V'_R$ and $V'_B$ are signals derived from the center level recording portions 47$a$, 47$b$, 47$c$, .... and 48$a$, 48$b$, 48$c$, .... in the recording medium shown in FIG. 2($d$).

The amplified signal is then fed into a clamp circuit 80 wherein the signal is accurately clamped to earth potential by a clamp pulse generated during blanking period $H_{BL}$ as shown in FIG. 10($f$). As a result, even if the level of the amplifier signal fluctuates, the level is kept constant at all times by the action of the clamp circuit 80.

The output of said clamp circuit 80 is then supplied to a low pass filter 90. Since said low pass filter 90 has an extremely high attenuation with respect to frequencies over 300–500 KHz, the sampling frequency of about 1 MHz included in the output of clamp circuit 80 is eliminated, and the instantaneous value of the (R-Y) signal forming the upper envelope of the output and that of the (B-Y) signal forming the lower envelope are balanced. The waveform of the output of said low pass filter 90 is shown in FIG. 10($b$). As shown in the figure, the balanced value during the period $T_{RB}$, in which the center level voltage $V'_R$ of the signal (R-Y) corresponding to the recording density 7.5 and the center level voltage $V'_B$ of the signal (B-Y) corresponding to the recording density 2.5 are included, becomes voltage $V'c$ corresponding to the recording density 5 which is required to separate the composite color signal made up of the two kinds of signals. Therefore, the output of said low pass filter 90 is fed to level extracting circuit 91 wherein the voltage V'c included in the period $T_{RB}$ is extracted as a separation level voltage of the two kinds of signals. FIG. 7 or a modification thereof, can be used as an embodiment of said level extracting circuit 91. When a pulse (FIG. 10($g$)) is fed into said level extracting circuit from the synchronizing pulse generator 60, a signal included in the period $T_{RB}$ is extracted from the output of the low pass filter 90 which is sustained during at least one horizontal scanning period H. Next, the extracted signal having a voltage V'c is supplied to the separation circuit consisting of diodes 67, 68 and resistors 69, 70 so as to fix the separation level. The output of said separation circuit is processed in the same way as described in FIG. 4, and then supplied to the encoder 63 wherein it is converted into a new NTSC television signal. In other words, the color signal (R-Y) passed through diode 67, whose waveform is shown in FIG. 10($c$) is detected and transformed as shown in FIG. 10($d$) by envelope detector 71$a$. In the clamp circuit 72$a$, to which a clamp pulse (FIG. 10($h$)) is supplied during period $T_{RB}$ by the synchronizing pulse generator 60, the center level of said detected signal is fixed to voltage $V_R$ provided by power source 73. Furthermore, in gate circuit 76$a$ to which a gate pulse (FIG. 10($i$)) is supplied during blanking period $H_{BL}$ by the synchronizing pulse generator 60, the voltage $V_R$ provided by power source 73 is introduced into the detected signal so that its waveform is transformed as shown in FIG. 10($e$) and finally supplied to encoder 63. In the meantime, the color signal (B-Y) passed through diode 68 is also supplied to encoder 63 via envelope detector 71$b$ and clamp circuit 72$b$ and gate circuit 76$b$ which are supplied with voltage $V_B$ by power source 74.

Accordingly, in the reproducing apparatus as described above, since the separation level voltage V'c can be obtained by balancing the instantaneous values of the signals derived from the center level recording portions previously recorded on the recording medium, it is not necessary to record another level in order to separate the color signals on the recording medium. As a result, full use is made of the frames and the recording is simple.

In any of the above embodiments, a raster can be formed by scanning the recorder or the flying spot tube energy beam in the horizontal direction on the recording medium which is continuously moved in the vertical direction at a given vertical scanning speed or by scanning said energy beam in the horizontal and vertical directions at given scanning speeds on the recording medium which is intermittently moved.

Having thus described the invention with the detail and particularity as required by the Patent Laws, what is desired protected by Letters Patent is set forth in the following claims.

We claim:

1. A recording medium comprising frames in which two kinds of amplitude modulated video signals are alternately recorded in the horizontal scanning direction of a raster as variations in the optical density of the medium without overlapping in the recording densities of the respective recording portions and at least one standard signal indicative of the signal intensity where the two kinds of signals are separated and/or the fixed bias levels of the two kinds of signals are recorded at the initial and/or terminal part of the horizontal scanning lines in the raster.

2. A recording medium according to claim 1 in which at least one standard intensity signal comprises a signal indicative of the signal intensity where the two kinds of picture signals are separated.

3. A recording medium according to claim 1 in which at least one standard signal comprises the fixed bias signals of the two kinds of picture signals.

4. A recording medium according to claim 3 in which the fixed bias signals are alternately recorded.

5. A recording medium according to claim 1 in which at least one standard intensity signal comprises the signal indicative of the separation intensity and the alternately sampled fixed bias signals of the two kinds of picture signals.

6. An apparatus for alternately recording two kinds of amplitude modulated video signals in a raster on a recording medium sensitive to an energy beam, comprising:

a. a recorder for exposing the recording medium to a scanned energy beam in a raster including means for modulating the d.c. beam intensity in response to a modulation signal, b. means for adding different fixed bias signals to the respective center levels of the two kinds of amplitude modulated video signals such that the composite signals do not have overlapping intensities, c. a switching circuit for alternately sampling said two kinds of signals having nonoverlapping intensities at a frequency higher than the horizontal scanning frequency of a raster to produce a modulation signal, d. means for producing at least one signal indicative of a preselected standard signal intensity into the modulation signal during the period corresponding to the initial and/or the terminal part of each horizontal scan, and e. a means for supplying the composite modulation signal to be recorded to the aforesaid energy beam recorder.

7. An apparatus according to claim 6 in which the means for introducing at least one standard intensity signal to the modulation signal is a means for introducing a signal indicative of a signal intensity where the two kinds of video signals are separated.

8. An apparatus according to claim 6 in which the means for introducing at least one standard intensity signal to the modulation signal are means for introducing signals indicative of the fixed bias signals.

9. An apparatus according to claim 8 in which said means for introducing signals indicative of the fixed bias signals to the modulation signal is arranged between the aforesaid means for adding different fixed bias signals and the switching circuit.

10. An apparatus according to claim 6 in which the means for introducing at least one standard intensity signal to the modulation signal is means for introducing signals indicative of s signal intensity where the two kinds of signals are separate and signals indicative of the fixed bias signals.

11. An apparatus according to claim 10 in which said means for introducing the standard signal indicative of the fixed bias signals to the modulation signal is arranged between the aforesaid means for adding the fixed bias signals and the switching circuit.

12. An apparatus for reproducing two kinds of amplitude modulated video signals from a recording medium comprising frames in which the two kinds of video signals are alternately recorded in the horizontal scanning direction of a raster as variations in optical density of the medium without overlap of the recording density ranges of the alternately recorded portions and at least one signal indicative of a preselected standard intensity recorded at the initial and/or terminal parts of the horizontal scan comprising:

a. means for driving said recording medium, b. means for scanning said recording medium and recovering a signal recorded on said medium, c. means for extracting the standard intensity signal from the recovered signal and converting it into a separation signal indicative of the signal intensity where the two kinds of video signals do not overlap, d. means for separating the recovered signal referred to in (b) at said separation signal intensity, and e. envelope detectors for respectively detecting the two kinds of amplitude modulated video signals from the signals separated by the separating means (d).

13. An apparatus according to claim 12 wherein the extracting means referred to in (c) comprises a means for converting the extracted standard intensity signal into two fixed bias signals, said apparatus comprising means for respectively adding fixed bias signals to the two kinds of video signals detected by the envelope detectors (e).

14. An apparatus for reproducing two kinds of amplitude modulated video signals from a recording medium comprising frames in which the two kinds of video signals are alternately recorded in the horizontal scanning direction of a raster as variations in optical density of the medium without overlap of the recording density ranges of the alternately recorded portions and a separation signal at the initial and/or terminal parts of the horizontal scan indicative of signal intensity where the two kinds of video signals do not overlap comprising:

a. means for driving said recording medium, b. means for scanning said recording medium and recovering the signals recorded on said medium, c. means for clamping the separation level of the recovered signal by using part of the separation signal, d. means for separating the output of said clamping means (c) at the clamping level voltage, and e. envelope detectors for respectively detecting the two kinds of video signals from said separated signals.

15. An apparatus for reproducing two kinds of amplitude modulated video signals from a recording medium comprising frames in which the two kinds of video signals are alternately recorded in the horizontal scanning direction of a raster as variations in optical density of the medium without overlap of the recorded density ranges of the alternately recorded portions and at the initial and/or terminal parts of the horizontal scanning a standard signal indicative of the center level of the two video signals comprising:

a. means for driving said recording medium, b. means for scanning said recording medium and recovering a signal recorded on said medium, c. means for extracting the respective center level signals from the recovered signal and converting them into a separation level voltage,
d. means for separating the recovered signal referred to in (b) at said separation level voltage, and
e. envelope detectors for respectively detecting the two kinds of video signals from the signals separated by the separating means referred to in (d).

16. An apparatus according to claim 15 wherein the extracting means referred to in (c) comprises a low pass filter for balancing the signals recovered by the scanning means (b), a means for extracting the signal of the balanced center level signals, forming part of the output of the low pass filter, and converting it into a separation level voltage.

17. An apparatus according to claim 15 comprising a means for respectively clamping the respective center levels of the two kinds of detected video signals.

18. An apparatus for reproducing two kinds of amplitude modulated video signals from a recording medium comprising frames in which the two kinds of video signals are alternately recorded in the horizontal scanning direction of a raster as variations in optical density of the medium without overlap of the recording density ranges of the alternately recorded portions and a separation signal indicative of a signal intensity where the two alternately recorded video signals do not overlap and the respective center level signals of the two kinds of video signals are recorded comprising:
a. means for driving said recording medium,
b. means for scanning said recording medium and recovering a signal recorded on said medium,
c. means for clamping the separation level of the said recovered signal by using the separation intensity signal,
d. means for separating the output of said clamping means (c) at the clamping level voltage,
e. envelope detectors for respectively detecting the video signals from said separated signals, and
f. means for respectively clamping part of the respective center level signals included in the two kinds of video signals detected by the envelope detectors (e).

19. A system for recording and reproducing at least two types of simultaneously produced corresponding amplitude modulation information signals, said signals being produced for arrangement of information in sequential frames, each frame comprising a scanning raster, each raster in turn comprising a plurality of scan lines, each scan line comprising information signals between blanking or retrace signals, said system including:
A. recording means comprising:
a. means for adding different fixed bias signals to the center levels of each type of information signal to provide adjusted center levels such that the signal intensities do not overlap,
b. means for producing at least one standard level signal indicative of the adjusted center levels of said information signals, said standard level signal being produced during the initial and/or terminal part of each scan line,
c. means for alternately sampling said types of information signals at a frequency higher than the scanning frequency,
d. means comprising a scanned energy beam for recording the composite sampled signals and said at least one standard level signal in monochrome on a raster on a recording medium,
B. reproducing means comprising:
a. means for scanning each raster on the recording means and recovering the said composite signal therefrom,
b. means utilizing the non-overlap in sampled signal levels and at least one standard signal for separating the types of sampled signals, and
c. means comprising envelope detectors for detecting and producing continuous signals from the types of sampled signals.

20. A system for recording and reproducing two types of simultaneously produced corresponding amplitude modulation information signals, said signals being produced for arrangement of information in sequential frames, each frame comprising a scanning raster, each raster in turn comprising a plurality of scan lines, each scan line comprising information signals between blanking or retrace signals, said system including:
A. recording means comprising:
a. means for adding different fixed bias signals to the center levels of each type of information signal to provide adjusted center levels such that the signal intensities do not overlap,
b. means for producing standard level signals comprising signals corresponding to each of said adjusted center levels and a separation level signal indicative of a reference between said adjusted center levels, said standard level signals being produced during the initial and/or terminal part of each scan line,
c. means for alternately sampling said two types of information signals at a frequency higher than the scanning frequency,
d. means comprising a scanned energy beam for recording the composite sampled information and center level signals and said separation level signal in monochrome on a raster on a recording medium,
B. reproducing means comprising:
a. means for scanning each raster on the recording means and recovering the said composite signal therefrom,
b. means utilizing the non-overlap in sampled signal levels and the standard signals for separating the two types of sampled signals, and
c. means comprising envelope detectors for detecting and producing two continuous signals from the two types of sampled signals.

21. A system according to claim 20 in which the means for recording produces the fixed bias signals simultaneously and thereafter alternately samples said signals in the same manner as the two types of information signals prior to recording.

22. A system according to claim 21 in which the reproducing means comprises means for adding the fixed bias signals to each of the two types of information signals during the blanking period.

23. A system for recording and reproducing two types of simultaneously produced corresponding amplitude modulation information signals, said signals being produced for arrangement of information in sequential frames, each frame comprising a scanning raster, each raster in turn comprising a plurality of scan lines, each scan line comprising information signals between blanking or retrace signals, said system including:

A. recording means comprising:

a. means for adding different fixed bias signals to the center levels of each type of information signal to provide adjusted center levels such that the signal intensities do not overlap, b. means for producing a standard level signal being a separation level signal indicative of a reference between the adjusted center levels of said sampled signals, said separation level being produced during the initial and/or terminal part of each scan line, c. means for alternately sampling said two types of signals at a frequency higher than the scanning frequency, d. means comprising a scanned energy beam for recording the composite sampled signals and said separation level signal in monochrome on a raster on a recording medium, B. reproducing means comprising:

a. means for scanning each raster on the recording means and recovering the said composite signal therefrom, b. means utilizing the non-overlap in sampled signal levels and separation level signal for separating the two types of sampled signals, and c. means comprising envelope detectors for detecting and producing two continuous signals from the two types of sampled signals.

24. A system according to claim 23 in which the means for reproducing comprises a means for extracting the separation level signal and approximate adjusted center level signals from said standard level signal.

25. A system according to claim 24 in which the reproducing means includes means for adding fixed bias signals to each of the two types of information signals during the blanking period.

26. A system for recording and reproducing two types of simultaneously produced corresponding amplitude modulation information signals, said signals being produced for arrangement of information in sequential frames, each frame comprising a scanning raster, each raster in turn comprising a plurality of scan lines, each scan line comprising information signals between blanking or retrace signals, said system including:

A. recording means comprising:

a. means for adding different fixed bias signals to the center levels of each type of information signal to provide adjusted center levels such the the intensities of the signals do not overlap, b. means for producing standard level signals comprising signals corresponding to each of said adjusted center levels, said standard level signals being produced during the initial and/or terminal part of each scan line, c. means for alternately sampling said two types of signals at a frequency higher than the scanning frequency, d. means comprising a scanned energy beam for recording the composite sampled signals and said standard level signals in monochrome on a raster on a recording medium, B. reproducing means comprising:

a. means for scanning each raster on the recording means and recovering the said composite signal therefrom, b. means utilizing the non-overlap in sampled signal levels and said standard signals for separating the two types of sampled signals, and c. means comprising envelope detectors for detecting and producing two continuous signals from the two types of sampled signals.

27. A system according to claim 26 in which the means for reproducing comprises a means for extracting a separation level signal from said adjusted center level signals for use in separating said two types of information signals.

28. A system according to claim 27 in which the means for recording produces said signals corresponding to each of said fixed bias signals simultaneously and thereafter alternately samples said signals in the same manner as the two types of information signals prior to recording.

29. A system according to claim 28 in which the means for reproducing comprises means for adding said adjusted center level signals to each of the two types of information signals during the blanking period.

* * * * *